United States Patent [19]

Cowan

[11] 3,918,677

[45] Nov. 11, 1975

[54] FLUID WAVEFORM SHAPING DEVICES
[75] Inventor: Larry Clyde Cowan, Saunderstown, R.I.
[73] Assignee: Leesona Corporation, Warwick, R.I.
[22] Filed: Nov. 8, 1973
[21] Appl. No.: 413,873

[52] U.S. Cl.......................... 251/61.1; 235/201 ME
[51] Int. Cl.² .................................... F16K 31/126
[58] Field of Search ... 251/61.1; 137/625.6, 625.66, 137/82; 235/201 ME

[56]     References Cited
         UNITED STATES PATENTS
3,601,155  8/1971  Brown........................... 137/625.66
3,722,526  3/1973  Henningsson................. 251/61.1 X
3,767,161  10/1973 Blatter.............................. 251/61.1
3,844,529  10/1974 Brandt, Jr........................... 251/61.1

OTHER PUBLICATIONS
I.B.M. Technical Disclosure, Vol. 15, No. 6, Nov. 1972, Pneumatic Pressure Amplifier; Bickford.

Primary Examiner—Arnold Rosenthal
Attorney, Agent, or Firm—Burnett W. Norton; Robert J. Doherty

[57] ABSTRACT

Fluid logic type system elements have structure and fluid flow paths which modify the shape of input fluid pressure signal waveforms to produce output waveforms of desired characteristics. Basic logic elements are of the taut flexible diaphragm type that control fluid flow paths through two opposed chambers by differential fluid pressures in the chambers on either side of the diaphragms. The chamber structure intercepting the diaphragm is constructed with critical profile shape to afford different characteristic responses to input fluid signals to the chambers. With such elements fluid signals may be introduced in various flow paths to achieve various output waveform shapes in response to generally on-off type digital input signals, including shortening, lengthening, inverting, delaying, and sharpening. Such functions as integration, differentiation, threshold detection and oscillation are attained. By use of passive resistive and capacitive fluid flow elements, delays and wave shaping features are simply introduced to improve the waveshaping versatility of the logic elements. Thus, simple logic elements or combinations thereof are employed together with construction of fluid flow path characteristics and selection of flow routes in a network to produce various modifications on signal pressure waveform shapes. Particular advantage is realized by using the dynamic negative going transitions of waveforms thereby providing fast switching signals, amplification and waveform shape controls.

6 Claims, 22 Drawing Figures

AMPLIFIER  FIG. 1

FOLLOWER  FIG. 2

SWITCH  FIG. 3

SQUARE WAVE GENERATOR

FIG. 9

THRESHOLD DETECTOR-AMPLIFIER

FIG. 10

MONOSTABLE

FLUID WAVEFORM SHAPING DEVICES

THE SPECIFICATION INTRODUCTION

This invention relates to fluid logic devices and more particularly it relates to fluid logic devices of the flexible diaphragm type connected in signal flow networks to control the shapes of signal waveforms.

PRIOR ART PROBLEMS AND STATUS

In general, such fluid logic devices are known in the art for specified operations with on-off digital type fluid pressure waveforms as evidenced by the applications for "Fluid Operated Logic Device," Ser. No. 165,446, now U.S. Pat. No. 3,779,267 and "Fluid Operated System," Ser. No. 349,635, filed Apr. 7, 1973, both assigned to the assignee of this invention. In these and other prior art devices a flexible diaphragm has been used to control fluid flow paths in performance of logic manipulations of digital type off-on discrete signals. These kind of fluid logic elements are known which perform basic "AND," "OR," "GATING" and "FLIP-FLOP" logic functions. However, when these elements are interconnected into more complex system environments various interfacing problems are introduced which have not been resolved by prior art techniques.

For example, it is desirable in an uncomplex system to operate both logic systems and load devices with a single source of fluid under high pressure, which might be for example 80 psi. If this is compared with atmospheric pressure as a "vented" condition, binary digital values 0 and 1 may be assigned to the two conditions and thus on-off type waveforms may be processed. However, one problem is amplitude deterioration of such signals after processing in certain logic steps. Thus, in order to avoid complex amplifiers and to permit systems with essentially limitless complexity of interconnected logic elements using a single source, logic elements having the ability to detect and reshape signals of deteriorated amplitude or waveshape would add considerably to logic system capabilities.

Also in interfacing various logic elements, it is desirable to accurately time various functions at a particular system time or waveshape amplitude. This might be done cyclically in different system times such as established by an oscillation device. Also it may be accomplished by accurately timing the start and finish of different system operations. In any event it is not desirable to leave to chance the various rise and fall times of signal waveforms in a system of any reasonable complexity. The introduction of delays in time to assure the proper system condition responsive to signals sometimes is necessary to avoid random errors because of residual noise conditions or unusual signal combinations that might arise in complex logic systems.

Accordingly it is clearly desirable to introduce techniques by which the shape of signal waveforms may be controlled, preferably within the same logic elements used for other logic functions in the system.

OBJECTIVES OF THE INVENTION

It is therefore a general object of this invention to provide waveform shaping techniques useful in digital fluid logic systems.

A more specific objective of the invention is to provide flexible diaphragm type fluid logic elements which provide signal waveforms of predetermined shape.

Another object of the invention is to provide control over the timing at both the leading and trailing edges of digital fluid signals.

Another object of the invention is to produce waveforms that may provide interfacing between fluid digital logic elements connected in a system operating on digital type signal waveforms of predetermined amplitude, shape and time characteristics thereby avoiding unscheduled logic operations.

BRIEF SUMMARY OF INVENTION

It has been found that the fluid flow paths of a flexible diaphragm type digital logic element can be modified by simple but effective structural features to control the operational characteristics and signal waveform response of the elements. Thus, this invention introduces the concept of providing a profiled seating area of controlled configuration to intercept the flexible diaphragm, thereby producing a controlled flow of fluid through the logic element and effecting a change of signal waveform shape or amplitude and controlling the time at which the waveform leading and trailing edges are formed.

The sensitivity of response of the diaphragm in controlling or gating flow paths at various pressures is found to be dependent not solely upon the differential fluid contact areas on opposite sides thereof as generally presumed in prior art devices but is critically responsive to the contact surface structure which engages the diaphragm at the fluid flow interface into a logic element fluid chamber on either side of the diaphragm. Thus a contact structure may be smooth, rough or leaky and may have different contact shapes to produce different signal response characteristics.

Therefore by interconnecting fluid signal flow paths in a system network through different contact structure configurations and fluid flow paths through the logic elements, various sorts of signal waveform variations may be achieved to resolve interfacing, timing, or signal deterioration problems, and which furthermore lead to production of different kinds of functional operations with simplified and efficient circuit configurations.

By employment of various sensitivities to pressure waveform levels, threshold detection is accomplished as well as squaring or sharpening of waveform leading and trailing edges. Also preferential switching characteristics afforded by various sensitivity levels provide embodiments for mixing or modulating waveforms. By matching threshold sensitivity characteristics, signals or fluid flow paths may be isolated or inverted. Configurations are provided for shortening or lengthening digital waveform pulses and in providing such waveform variations as sawtooth waves or oscillations. These latter configurations are particularly enhanced and simplified by passive constrictions or expansions of fluid flow paths to produce resistive and capacitive effects.

THE DRAWING

Other objects, features and advantages of the invention will be found throughout the following more detailed description of the invention and the various preferred embodiments set forth in the accompanying drawings, wherein:

FIGS. 2 to 4 are partial section views of further diaphragm engaging structural embodiments afforded by this invention to achieve different signal waveform modifying operational characteristics wherein

LOGIC ELEMENT CONSTRUCTION FEATURES

Figure 1:
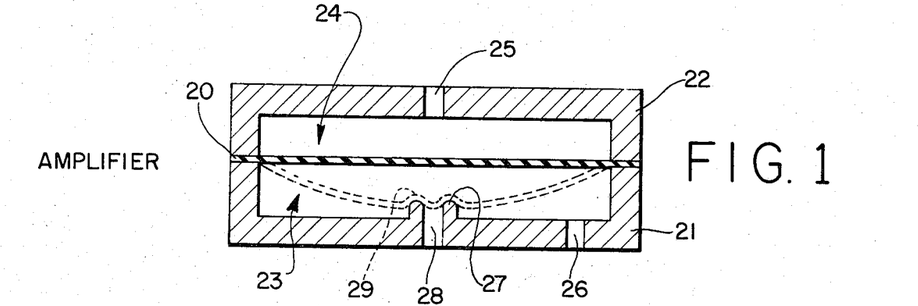
FIG. 1 is a section view of a generally cylindrical logic element embodiment constructed in accordance with the invention to set forth a diaphragm engaging profile structure for controlling the signal fluid flow paths in a predetermined mode.
Figure 2:
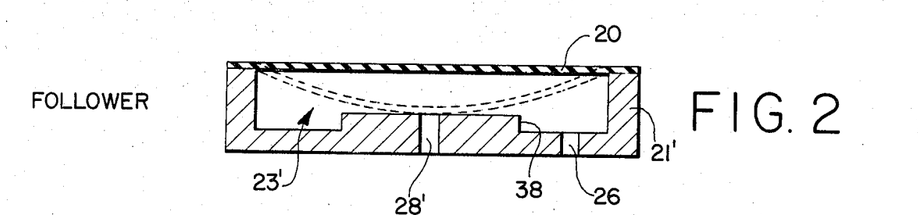

Consider now the construction of the basic logic elements as displayed in FIG. 1, for example. A thin impervious flexible diaphragm 20 made of a rubber sheet or other elastomer material is held taut at its outer periphery between two housing members 21, 22 by means of fasteners (not shown) to form first and second chambers 23, 24 for confining respective fluid flow and pressure signals to bear upon opposite sides of the diaphragm.

Each chamber 23, 24 has access channels for introducing and withdrawing fluid such as air therefrom. These channels may be located either at the center of a generally circular diagraphm 20 as the access channel 25 into chamber 24, or offset so that the passageway is not controlled by the deflected diaphragm 20, as access channel 26 into chamber 23. Either chamber may have one or more such access channels to handle the required fluid flow paths for various sorts of logic functions.

When a pressure differential appears in chambers 23 and 24 the diaphragm 20 is flexed into a substantially spheroid shape and forced into contact with a contact surface on the housing wall near the center of the diaphragm. Thus the diaphragm 20 through operation of a greater fluid pressure in chamber 23 may be flexed to close the central access channel 25. However, if flexed as shown in phantom by greater pressure in chamber 24 the diaphragm does not contact the offset channel 26 or control flow of fluid therethrough but only closes centrally located channel 28.

A signal passageway 28 with surrounding protruding lips thereon is located to intercept the diaphragm as shown in phantom position. The lip structure 27 is formed to extend into the first chamber 23 enough with the appropriate chamber dimensions, so that it contacts and modifies as shown at 29 the flexed spheroid curvature surface otherwise attained by the diaphragm in response to the differential pressure in the two chambers. Thus at the midregion 29 the diaphragm surface is indented by the lip structure on both sides of the lip to wrap about the lip surface and seal the signal passageway 28 to prevent flow of fluid therethrough. The lips are smooth and may be an integral part of the housing member 21 formed of metal or a plastic.

In operation the element of FIG. 1 may be considered an amplifying valve or gate when used with a dynamic negative going waveform transition as an output signal. Thus, a fluid pressure signal flow into blind chamber 24 through access channel 25 may be used to hold sealed a seat about lips 27 because of greater pressure-area on diaphragm 20 in chamber 24 than that in passageway 28, even when the fluid is at a greater pressure than that of chamber 24. When sealed, fluid cannot flow through chamber 24 through the pathway out channel 26 from signal passageway 28. In operation the lip structure 27 causes rapid switching from closed to open condition as the diaphragm leaves the lip seat 27. By using the negative transition of a pilot signal at access channel 25 as a signal source a small change of signal pressure such as 20 psi can control a much larger pressure flow such as 80 psi through passageway 28 and thus act as an amplifier.

In accordance with this invention it has been found that the contact structure of the signal passageway intercepting the flexed diaphragm is critical in shape and will substantially change the operating characteristics of the logic elements. Thus, for the purpose of switching or gating, the logic element of FIG. 1 because of the lip shaped contact surface structure of signal passageway 29 provides increased sensitivity.

Figure 5A:
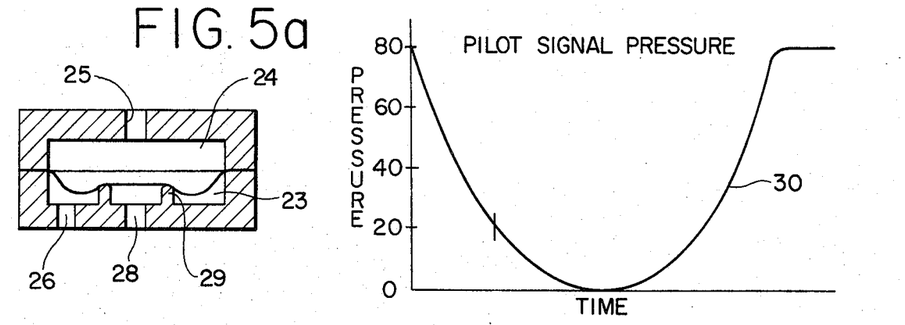
FIGS. 5a through 5f show waveform diagrams respectively identifying waveform input-output modification characteristics of the embodiments of FIGS. 1 to 4 as indicated by corresponding sketches alongside the waveforms.
Figure 5B:
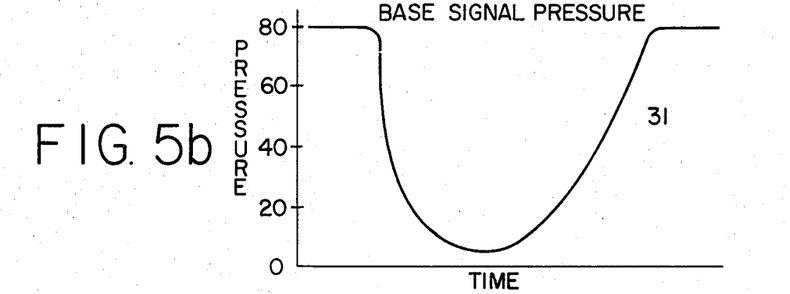

The operational characteristics for this type of structure may be shown for a particular set of dimensions and circuit arrangement by the input-output waveform diagrams of FIGS. 5a and 5b. Consider the control waveform of FIG. 5a to represent an input signal pressure waveform 30 to chamber 24 through access channel 25. A typical set of pressures for operation of the logic elements is 80 psi and some lower value approaching zero representing for example logic binary states 1 and 0. Waveform 30 shows a reduction buildup of pressure from 80 psi to 0 and back to 80 psi in compartment 24 over a cycle that may occur in a fraction of a second, for example.

Waveform 31 of FIG. 5b represents a signal pressure waveform at the supply signal passageway 28 when an 80 psi continuous supply pressure source is provided thereto through a flow restriction path comprising a resistor element, and the offset access passageway 26 is vented to atmosphere. Depending upon the flexibility of the diaphragm, the sharpness of the lips, the depth of penetration and the diameter of the signal passageway 28 the fluid flow path into signal passageway 28 may be unsealed at various predetermined pressure point along the falling slope leading edge of waveform 30. A typical pressure, as shown by the marker, is at 20 psi so that the device will give a four to one amplification ratio in controlling an 80 psi signal flow source. Typical dimensions for achieving this would be with a 0.050 inch lip height of 3/16 inch outer diameter chamber. The signal flow passageway diameter would inch and the diaphragm made of rubber has a thickness of fifteen mils. It is important to have a smooth lip surface to decrease friction to let the diaphragm wrap itself about the lips in the sealing process and to release without binding.

Thus at 20 psi in chamber 24 the diaphragm is wrapped around the lip at 29 tightly enough to seal the flow of fluid from the 80 psi source into chamber 23 as indicated by the leading transition edge of waveform 31. It may be noted that the leading edge of response waveform 31 rapidly switches to the low pressure state and thus provides a very fast dynamic operating output signal. Also the trailing edge shape substantially follows the input signal path from low to high pressure and may thus be used in some forms of waveform shaping devices.

In addition increased switching sensitivity permits this logic device to operate even when signal amplitudes deteriorate or are dissipated in circuit or load operations and the output waveform 31 gives a transition of almost the full supply pressure range of 80 psi when the sealing signal falls to a level approaching 20 psi, for example. Thus the device operates as a signal reshaper. This operating characteristic formed by shaping the diaphragm engaging surface structure may also be used in a threshold detection operation, a timing operation, and a waveform shaping or sharpening operation, for example. Consideration of the operational waveforms shows the switching threshold to be 20 psi so that only fluid signals below that pressure value would result in a switching signal transition at the leading edge of waveform 31. Elements may be designed for appropriate threshold levels by changes in the contour of the lip surface and other cavity dimensions.

Should the leading edge of input waveform 30 be a linear ramp-like wave or sawtooth for example a time interval between the start of the transition and the switching of waveform 31 may be identified to thereby provide a time discrimination function and exactly identify the leading edge time of output waveform 31. If the leading edge of waveform 30 merely indicates deterioration of a switching transition because of leaks, flow circuit resistive and capacitive losses, then the element acts as a digital signal reshaper or sharpener providing a better defined leading edge on waveform 31, to be used in subsequent logic circuit functions.

Figure 3:
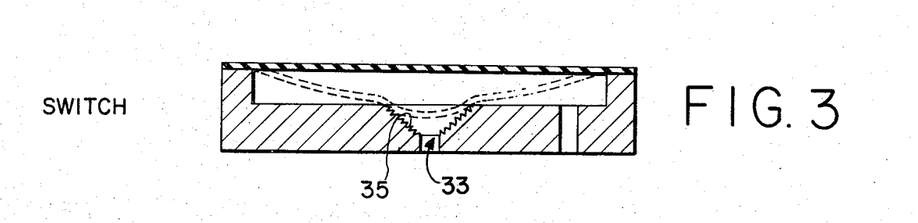
Figure 5C:
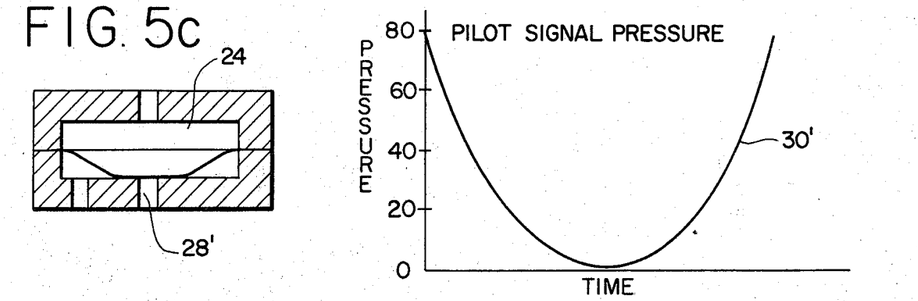

The foregoing performance with lip shaped diaphragm contact structure at 29 may be contrasted with a flat surface as at access passageway 25 into chamber 24 or the pedestal type platform 33 of FIG. 3, which is structured to establish a different operational characteristic for signal passageway 28. The device is termed a follower or may be considered to have a one to one input-output characteristic as shown by waveforms 30 and 31 respectively in FIGS. 5c and 5d. Structurally the pedestal 33 is made large enough to intercept diaphragm 20 and flatten it out on the flat surface about a substantially cylindrical centrally located input port opening 28 into which the fluid flows and provides a fluid cushion which thereby must be squeezed tight by a flattened diaphragm surface to seal the port. Thus if an input waveform 30 were considered, the corresponding output waveform 31 would be substantially the same shape. This structure therefore gives the logic elements the capacity to partially block the flow of fluid and provide a substantially linear control of an output by an input signal rather than to produce a snap type sealing or gating operation especially even when it is preferential to use the leading edge or dynamic negative transition from source pressure at 80 psi to some lower pressure near atmosphere. The complete fluid flow seal-off occurs therefore at substantially the same switching pressure in both chambers 24 and input passageway 28. When the passageway 28 is sealed by source pressure it may be held in the conventional manner by an equal pressure signal in chamber 24 because of the slightly different diaphragm fluid contact area ratios on opposite sides thereof. Thus, fluid in chamber 24 contacts the entire diaphragm surface area while in a sealed position only that surface area actually flattened out against the flat surface about the access channel of signal passageway 28 is acted upon by the fluid on the opposite side.

Figure 5D:
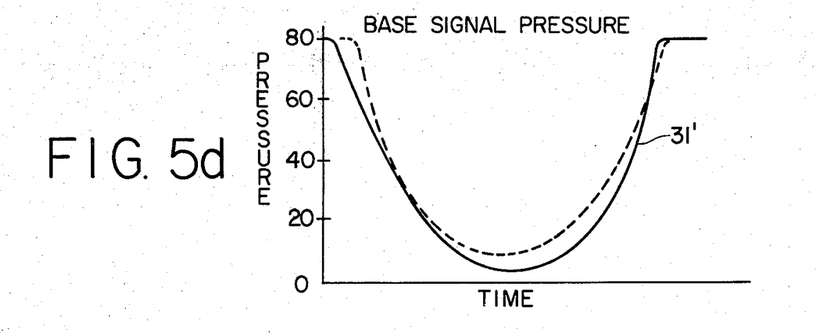

It is noted that this operation mode occurs since it is difficult to seal flow of fluid over a flat air bearing surface formed when the spheroid curvature of the flexed diaphragm is flattened out on the surface area extending around the outlet port of channel 28 by this diaphragm contact surface structure embodiment. Thus, to close the signal passageway the force on the diaphragm in chamber 24 must be sufficient to force a flat deformed diaphragm surface through a fluid cushion and into sealing contact with the top surface of the pedestal 33 or equivalent flat surface shown for access passageway 25 in chamber 24. The flat contact surface must be smooth in a radial direction to obtain a sealed signal flow passageway but could for example contain annular ring grooves. In this embodiment, when the diaphragm is either released or closed about port 28 as shown at the respective leading and trailing edges of waveform 31 by decreasing or increasing pilot pressure, the result is a substantially linear action rather than a sharp switching transition.

The further embodiment of FIGS. 3 or 4 termed a switch has a leaky diaphragm contact surface. Thus FIG. 3 presents a substantially conical indented signal passageway outlet 35 which therefore provides a greater sealing area into which the diaphragm must be forced before sealing about the rims thereof. The inner conical surface 35 is roughened with fine serrations (shown by schematic surface notation 33) of such dimension that the diaphragm 20 will tend to leak fluid therethrough and prevent conforming thereinto to seal the flow of fluid through the passageway until substantially the full pressure magnitude (80 psi for example) is attained and the diaphragm seals about the edges. The size and shape of the outlet and dimensions of serrations or surface roughness characteristics contribute to the modified performance characteristics of this waveform shaping logic element embodiment.

Figure 4A:
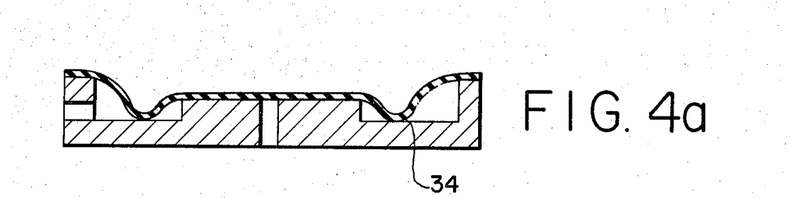
FIGS. 4a and 4b are respectively elevation and plan views of portions of a logic element embodiment.
Figure 4B:
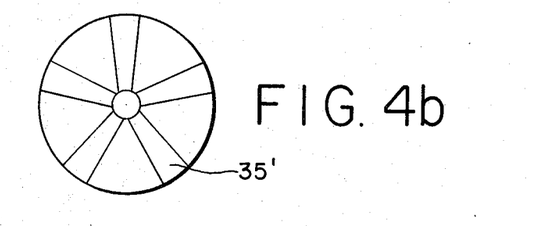

FIG. 4a in elevation shows a pedestal and FIG. 4b in plan the leakage grooves 35 therein of a further embodiment operating in this fashion. The diaphragm therefore leaks until sealed about the pedestal at positions 34 for example.

Figure 5E:
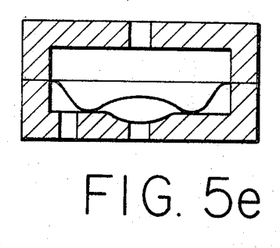
Figure 5F:
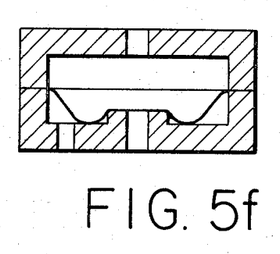

As may be seen from the waveforms of FIG. 5e and 5f, this type logic element sharply switches at both leading and trailing edges to form a substantially square output wave 37 from the sloping edges of input waveform 38. The switching point may be chosen by the dimensions of the serrations and surface area and for some operational functions preferably is substantially full pressure of the system such as marked at 60 psi. This embodiment is particularly useful in obtaining a sharpened fast switching leading or trailing edge at the signal input waveform terminal with a transition from 80 psi to 0. Thus, in logic systems which have higher pressure signals and respond to negative transitions caused for example by venting to atmosphere a pressure source, surface contact structure or profile which may be termed leaky will provide for very quick response to a small downward variation of signal pressure and becomes a sensitive and rapidly switching logic element. On the trailing edge of waveform 39 it is shown that there is a threshold where the signal level must increase above about 30 psi as marked before the sealing operation is started and it is not complete until substantially the full source pressure is reached.

It is to be recognized in the foregoing embodiments that this invention has introduced a different mode of operation into the digital fluid logic elements of the flexible diaphragm type since the operation and switching characteristics are made dependent upon the shape and structural characteristics of the diaphragm engaging structure about a signal passageway or access port rather than solely upon the differential of diaphragm surface areas contacted by fluid signal flow on opposite sides of the diaphragm as relied upon in the prior art when the diaphragm "kisses" an outlet port. This change in operational mode therefore provides an element which can be used in a fluid signal controlled system or network for conversion of input fluid signal waveform shapes into output fluid signal waveform shapes of different configuration.

One common feature of the three embodiments of FIGS. 1 to 4 is the provision of a fluid control seat for the diaphragm of increased seating area when compared with the prior art techniques of kissing a small fluid pipe or port with the diaphragm and relying solely upon a differential diaphragm control area for providing operational characteristics. The operational mode of sensing negative going dynamic fluid pressure transitions is also important in producing fast switching times and different waveform responses. Thus, the present techniques may be used advantageously to control fluid flow paths in more ways and with greater sensitivity and faster switching modes even with larger flow pipes and ports through the logic element chambers. In considering these common features, as applied to the FIG. 1 embodiment, the lip like structure provides increased seating area by requiring the diaphragm to wrap about the thin smooth protruding lips. In the FIG. 2 embodiment the fluid flow into the port is spread over and therefore is cushioned on a flat surface inside the chamber so that the diaphragm must be flattened against the fluid cushion of increased area by high sealing pressure in order to stop flow into the chamber. In the FIGS. 3 and 4 embodiments a leaky seat of conical or pedestal form is provided and the roughened surface keeps the sealing condition at a high pressure level.

WAVEFORM SHAPING CIRCUIT CONFIGURATIONS

Figure 6:
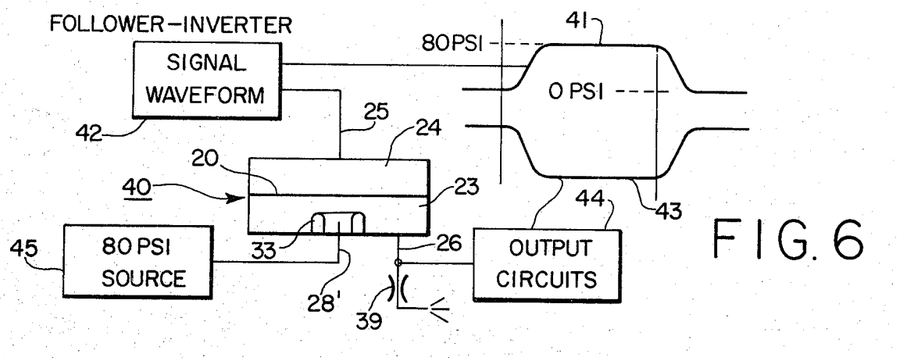
FIGS. 6 and 7 are schematic logic circuit configurations setting forth operation characteristics of the embodiment of FIG. 2.

The logic element 40 of FIG. 6 is shown schematically with a lipped pedestal 33 indicated for identifying the amplifier characteristic discussed hereinbefore in connection with the embodiment of FIG. 1. Thus like reference characters are used for ready reference in this FIG. 6 schematic circuit configuration and where feasible throughout the following description.

A signal input fluid logic pressure waveform 41 is provided at input lead 25 by an input circuit 42 which may be part of a logic system producing gated fluid flow pulses representing on-off digital type signals. The output signal as developed by vented flow through resistor 39 however is inverted and is available at an output circuit 44 for use in further logic or waveform shaping circuits.

The output waveform is derived from a connection to an 80 psi source 45 of constant fluid pressure which passes fluid through the first compartment 23 by way of offset channel 26 into the utilization circuit means 44. Thus with zero pressure in the second chamber 24 the flow of fluid from source 45 to the output circuits 44 is unimpeded by the diaphragm 20 and is developed by flow through resistor 39 to have a pressure substantially above atmospheric. As the pressure in chamber 24 gradually increases the diaphragm 20 is pressed against the outlet surface for signal passageway 28 with gradually increasing force so that the pressure of fluid flowing to the output circuits 44 decreased until the passageway is eventually sealed at an input waveform pressure near the limiting 80 psi maximum of the fluid supply source. By using a known source pressure and an atmosphere or vented (zero) reference two binary digital level limits at higher and lower levels are readily identified for operation in logic networks. As before described it is generally desirable to use the negative going transition signals from high to low pressure conditions. Thus it may be seen that this embodiment inverts the positive going leading edge sense of the signal transitions where a "Not" logic function is desirable. On both the leading and trailing edges of the output waveform 43, the shape substantially follows the input waveform 41 shape as pressure changes in chamber 24. Accordingly, trailing edges of the output waveform 43, the shape substantially follows the input waveform 41 shape as pressure changes in chamber 24. Accordingly, an inverted waveform of one-to-one shape or amplitude and time relationship is afforded. Note that the logic element 40 also serves to isolate the input signal circuits 42 from the output signal circuits 44 by means of the impervious diaphragm 20, so that for example the utilization device 44 may be actuated directly by fluid power from the source 45 without requiring fluid flow or power from the signal source 42 other than minor circuit losses used in the movement of diaphragm 20. Accordingly, this device acts similarly to a vacuum tube amplifier in controlling flow of power from a source supply 45 to a load 44 under control of a signal varying in significant pressure amplitude but isolated from the output load circuits 44. Also similarly the control signal may not require significant power since control may be effected without substantial fluid flow losses. The use of blind chamber 24, that is one without a second fluid flow outlet, is not necessary but provides a simpler element and reduces control signal losses by retention of fluid within the input circuits 42.

Figure 7:
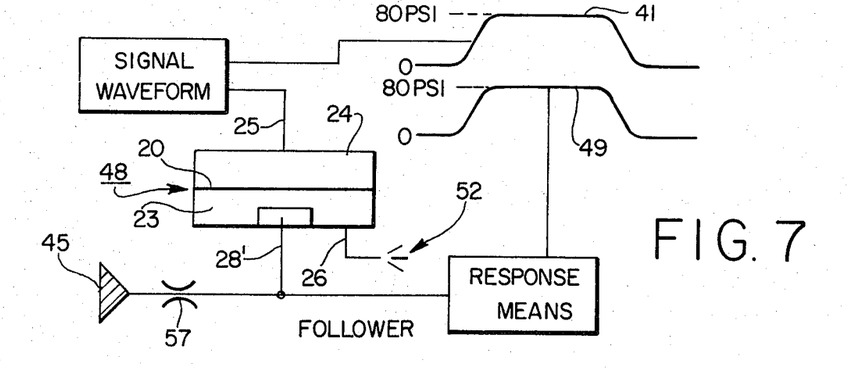

As may be seen by logic circuit 48 of FIG. 7, a similar linear waveform control operation can be achieved with a different circuit configuration, without signal inversion resulting in a substantially identical output waveform 49. In this embodiment the supply source 45 is shown schematically, and is connected through a flow channel restriction resistance 51 to response means 44. Because of the resistance, a limited maximum flow rate of fluid is permitted to the utilization circuits since a pressure drop is established by the resistor 51, but in any static flow condition full source pressure may be developed at the response means 44.

The resistor 51 is used to protect the source 45 pressure and limit losses through the channel 26 when vented to the atmosphere as indicated at 52. Thus the first chamber 23 will have, when vented, a pressure approaching zero when the diaphragm 20 is not in sealing engagement with the outlet from signal passageway 28. This pressure prevails at the response means 44. As the pressure in chamber 24 builds up and restricts flow of fluid through chamber 23, the pressure at the response means 44 builds up as shown by waveform 49 in response to partial blocking of the flow path through signal passageway 28 until it nears the source pressure when the flow path from 28 to 26 is sealed. Then the full source pressure of 80 psi may appear at the output means 44.

Figure 8:
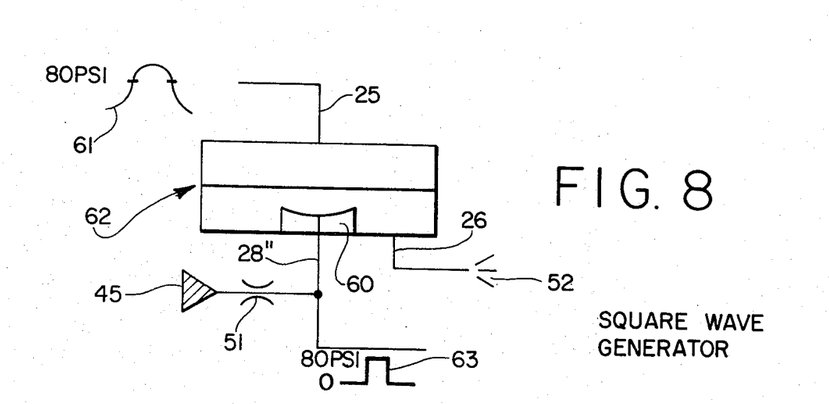
FIG. 8 is a schematic diagram of a circuit embodiment providing square wave output waveform characteristics.

In the schematic diagram of FIG. 8 the serrated diaphragm contact surface as explained for FIGS. 3 and 4 is represented by the concave pedestal symbol 60. Assuming an input pressure waveform 61 at lead 25, the sealing or switching threshold is reached at the 80 psi positions on the leading and trailing edges. At those positions fast switching from open to sealed condition will result so that the output waveform 63 will have corresponding leading and trailing edges generated at those instants, and will have a squared top that does not exceed the 80 psi pressure of source supply 45.

Output port lead 26 is vented and the output signal is taken from lead 28. Accordingly, because of vent 52, until the input signal waveform 61 pressure exceeds the switching threshold of element 62, the pressure at the output lead is substantially zero, from which a sharp square wave transition is made upon sealing signal passgeway 28 to the full source pressure (80 psi), until the waveform 61 again falls below the sealing pressure.

Figure 9:
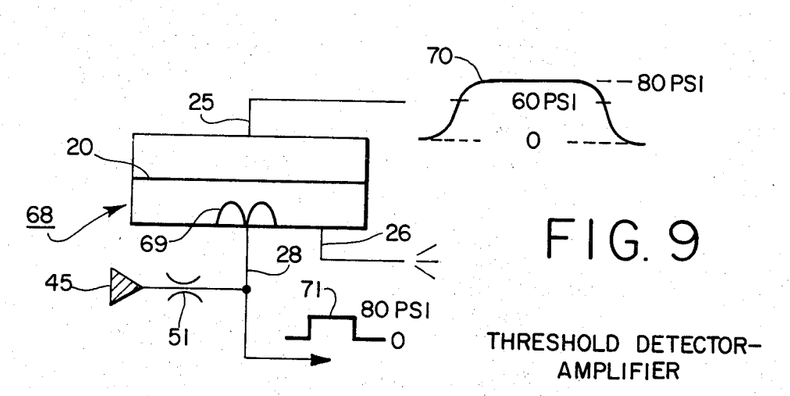
FIG. 9 is a schematic diagram of a circuit embodiment providing increased switching sensitivity at a predetermined threshold pressure.

The embodiment of FIG. 9 shows element 68 schematically with the lip pedestal structure 69 indicating the diaphragm contact surface profile to correspond to the configuration of FIG. 1, where the circuit flow connections operate the element in a threshold detector or pulse height amplifier mode. Thus, the leading edge of an input waveform 70 rising to 80 psi deflects diaphragm 20 into contact with lips 69 in a sealing engagement at near 80 psi when a fluid pressure signal flows through pilot signal passageway 25. This stops flow of fluid from source 45 out vented passageway 26 to provide at the output lead a waveform 71 with a sharp leading edge transition from 0 to 80 psi on the trailing edge or negative transition of the input waveform however the circuit operates effectively to give switching control with an amplification of four to one. Thus a 20 psi decrease of signal waveform will permit the diaphragm 20 to unseal from seat 69 and control a nearly 80 psi swing of the output trailing edge waveform. Thus, an amplifier action is attained by this embodiment, and a change of signal waveform of predetermined amplitude such as 20 psi may be detected in a threshold mode.

Figure 10:
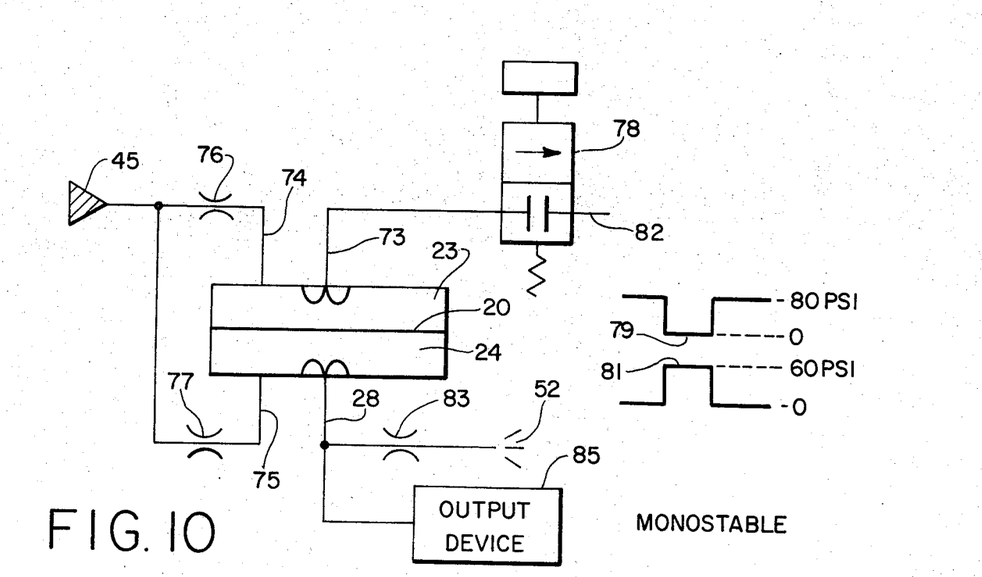
FIG. 10 is a schematic diagram of a circuit embodiment providing a preferred stable state of operation.

A logic circuit configuration that attains a preferable state operating in a monostable mode can be constructed as shown in FIG. 10 with lip profile structure in both chambers 23 and 24. A common supply source supplies both chambers 23, 24 at the offset positions 74, 75 respectively through resistors 76, 77. At the input signal passageway 73 to chamber 23 is connected a manual venting switch 78 which serves to open the flow path to vent 82 and thereby selectively evacuate the chamber 23 to atmosphere, such as for example, shown by waveform 79. The venting may occur whenever fluid flow from source 45 is not blocked in chamber 23 by diaphragm 20 at the value seat profile. Resistor 76 permits the pressure to fall to near atmospheric when so vented while maintaining source pressure at 80 psi.

Initially flow through chamber 24 and signal passageway 28 is closed before switch 78 is actuated and the pressure attained at output device 85 is at atmospheric (0) pressure by means of vent 52. After switching to close line 73 and open line 28 by means of valve 78 the pressure of source 45 retains the diaphragm in that condition only as long as switch 78 is closed, and thus waveform 81 will exhibit its higher pressure condition. When switch 78 is closed since vent 52 is normally open the pressure in compartment 23 will exceed that in compartment 24 and cause the diaphragm to close line 28 in the stable position.

Because of series resistors 77, 83 and vent 52 the pressure at the output waveform and output means 85 may be reduced somewhat at the high pressure position (60 psi) when switch 78 is open permitting the diaphragm to open passageway 28 and let fluid flow from source 45 to the output device 85. Whenever the switch is released then the diaphragm snaps back to close signal passageway 28 again and the output device 85 is vented to zero.

Sawtooth waveform generators are useful as time bases and may be used as oscillators equivalent to multivibrators. The configuration of FIG. 11 indicates this can be done with a single logic element and the passive circuit components comprising resistance 88 and capacitance 89. The capacitance 89 comprises simply a volume larger than the fluid flow paths to accumulate and delay pressure buildup or decrease as transition pressure waveforms are encountered. Therefore it takes a finite exponential time to fill or charge the volume and to discharge it. This is equivalent to a capacitor in an electronic circuit. The volume may be a separate element or could simply be a larger entrance passageway into logic element 90, and the capacitance changes with the volume.

Figure 11:
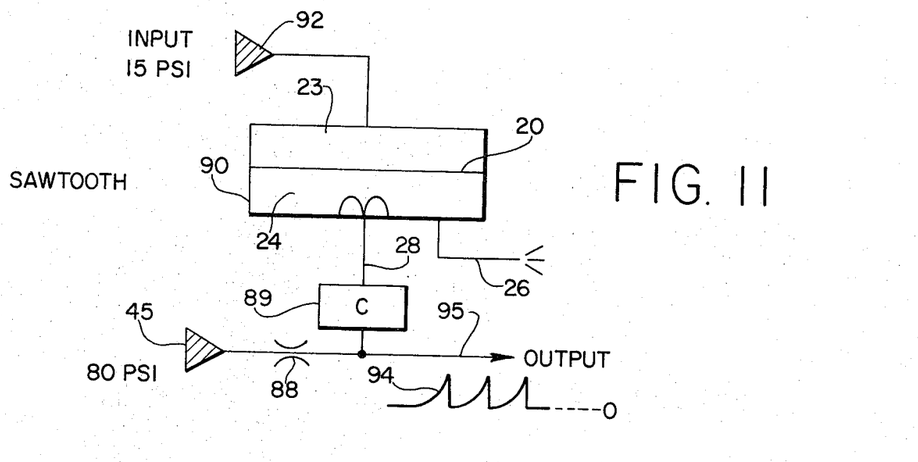
FIG. 11 is a schematic diagram of a circuit embodiment fpr producing sawtooth waveform characteristics in a cyclic oscillation pattern if desired.

The upper chamber 23 has a supply 92 with a lower supply pressure of 15 psi, and the element 90 has an amplifier lip structure in chamber 24, so that the supply source 45 of 80 psi may be controlled by a 15 psi signal. Since the chamber 24 and thus the pressure source 45 is vented at 26, the source 92 provides a higher pressure which tends to close signal passageway 28 in the vented condition. Then when the pressure through capacitor 89 builds up to exceed the pressure of input source 92, the diaphragm unseals line 28 and vents the chamber 24 at 26 to institute a further cycle. In operation, the frequency and rise time of the sawtooth is controlled by the R-C circuit time constant. A single sawtooth or ramp wave can be generated if the input sources 92, 45 are pulsed or gated over a corresponding time interval.

At the output lead 95 the ramp edge of the sawtooth waveform 45 is generated as the capacitor 89 is charged through resistor 88 to a pressure from supply source 45 that permits switching of diaphragm 20. This occurs when the signal passageway 28 is sealed by the diaphragm in response to input source 92 pressure. When the pressure at input passageway 28 exceeds the pressure of input source 92, the flow through chamber 24 to vent 26 will cause a rapid discharge of capacitor 89 and the sharp trailing edge of the sawtooth wave 94 to a pressure near zero established as fluid flows to vent 26 through resistor 88. As the pressure thus falls the input source 92 therefore can again seal signal passageway 28 and start a new ramp function.

Figure 12:
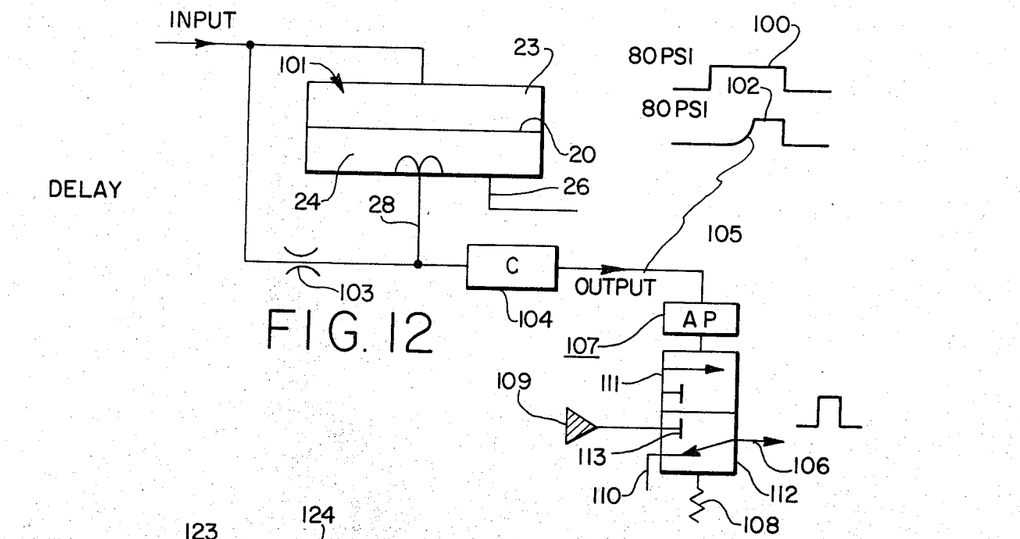
FIGS. 12 and 13 are schematic diagrams of circuit embodiments providing for delayed response to a signal input waveform.

If a logic system sequences signals and operations in a complex logic network it is difficult to forsee all possible causes of error in start-up and shut-down operations because of residual conditions, build up times for attaining static or working condition and other noise influences. Thus, it is useful to simplify circuit and system design by simply delaying the start of signal processing after a system is turned on until a time period elapses for stabilizing circuit conditions. In such cases there may also be a need to terminate the waveform at a predetermined time. While it is noted that the configurations of FIGS. 1 to 4, as seen from the waveforms of FIGS. 5a to f, will supply a delay before switching which is advantageous in avoiding response to small noise signals, this action alone is not of long enough duration to await the cycling of a logic circuit through residual operations after shut down for example, so that startup is always from a predetermined set of logic conditions. A simple logic circuit configuration for providing a signal a predetermined time after an event occurs is shown in FIG. 12.

Accordingly an input pulse pilot signal waveform 100 may be applied to an amplifier element 101 at the upper chamber 23. An output waveform 102 may be derived from the processing of this input waveform through a series R-C circuit 103, 104 and developed at lead 105. An isolated output may be provided at lead 106 by means of air pilot 107 and corresponding valve switching arrangement. This prevents output loading on the capacitor 104 which might distrub the delay time.

In operation the leading edge of input waveform will seal the signal passageway 28 because of the presence of resistor 103 and the necessity to charge capacitor 104, which reduces pressure in chamber 24 below that in chamber 23 causing diaphragm 20 to switch. This condition prevails for the duration of the input waveform 10 to keep vent 26 closed and permits the capacitor 104 to be charged as shown at the leading edge of waveform 102. Thus the flow of fluid to the output line 105 becomes a function of the R-C time constant and does not build up to enough pressure to operate the air pilot valve or logic device 107 until a predetermined time interval identified by the leading edge of waveform 102. when the input waveform 100 expires at the trailing edge, signal passageway 28 is opened and the capacitor 104 is vented at 26 to await a further cycle of operation.

The isolating valve 107 is schematically shown with a spring 108 showing the device is held in the preferred position whereby supply 109 is blocked at 113 and therefore does not pass fluid to outlet 106. The output 106 may be vented at 110 if desired in the static condition of air pilot 107. When the pressure on output line 105 is sufficient the upper configuration 111 will replace the lower (static) configuration 112. This permits fluid to flow from source 109 to output lead 106. As soon as the input waveform expires, the capacitor 104 will be vented and the air pilot is returned by spring 108 to condition 112 thus providing a square wave type output waveform isolated from capacitor 105.

Figure 13:
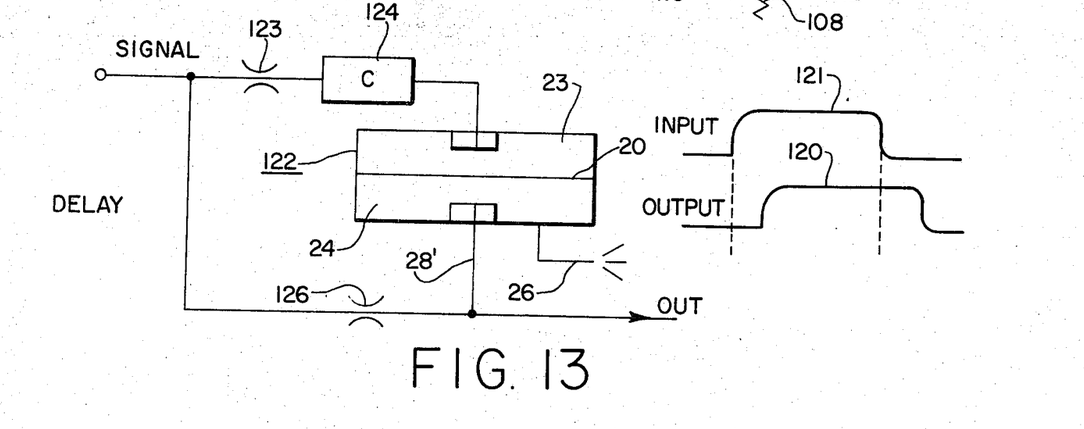

A circuit configuration for simply delaying the start of an output pulse 120 when an input pulse 121 is received is shown in FIG. 13. The logic element 122 in this embodiment comprises the linear amplifier version with a one-to-one signal control ratio. An R-C circuit 123, 124 couples the input signal to the upper chamber 23 to introduce a delay time before the signal passageway 28 is sealed by diaphragm 20 to close vent 26 and produce the output waveform 120. Resistor 126 protects the signal pressure when lower chamber 24 is vented. Thus when the flow of input signal fluid through the R-C time constant circuit 123, 124 reaches a sufficient pressure to move diaphragm 20 into sealing engagement with signal passageway 28 the leading edge of the output waveform 20 will be formed. At the expiration of the signal pulse, a similar delay will be encountered until capacitor 124 discharges to permit vent 26 to be opened. In this discharge circuit (provided the signal source is isolated and does not receive flow of fluid from capacitor 124 and the discharge goes to the output means) the time constant is longer, requiring flow through two resistors 124 and 126. Accordingly this circuit embodiment may be used when a delay is required at the trailing edge as well. By use of a linear type profiled logic element input-output switching waveforms conform except to the extent modified by the R-C shaping network. In general the waveform illustrations used herein are typical of conditions obtainable with specific engineering parameters, which can be varied by those skilled in the art. Thus, the sizes of cavities, pipes and relationships of pressures and waveform shapes may be chosen to attain specific functions that may vary from those illustrated.

Figure 14:
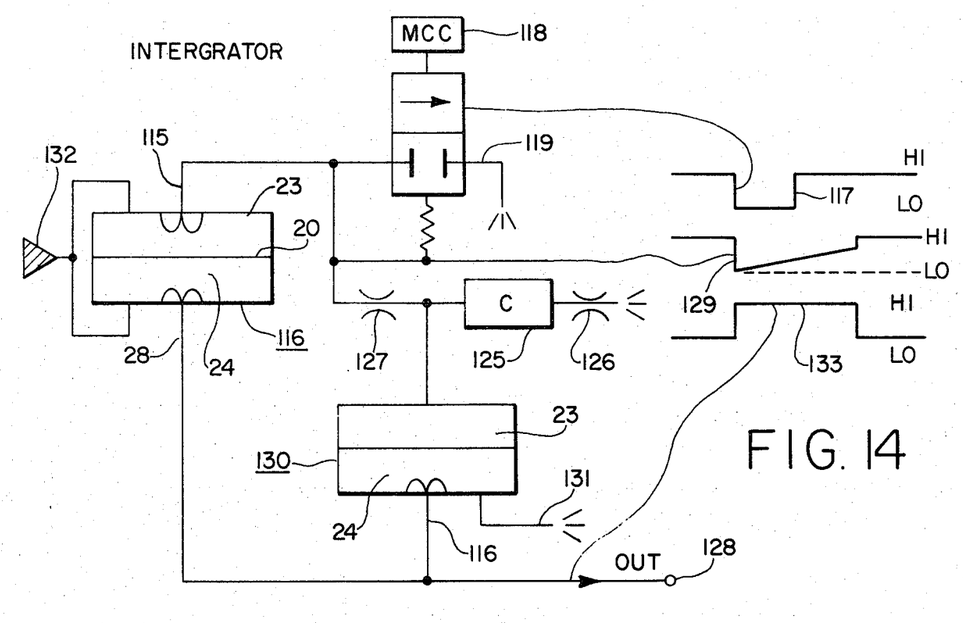
FIG. 14 is a schematic diagram of an integrator circuit embodiment for increasing the duration of an input signal waveform.

If the waveshaping function desired is that of pulse stretching or integration, the circuit configuration of FIG. 14 may be used. This circuit operates in the manner of a monostable one-shot circuit that provides from a trigger waveform an output waveform of predetermined greater duration which upon expiration automatically returns the circuitry to a static stable state. In this case an input waveform 117 may be obtained for example from the mechanical or manual pilot valve 118, where the source pressure flowing through the upper chamber of a flip-flop element 116, operating in the manner described in co-pending application Ser. No. 349,635, is vented at 119.

Element 116 is a bistable device that holds its condition until one of the compartments 23, 24 receives a negative going pressure waveform transition to cause a switching of the position of diaphragm 20. Thus in stable condition diaphragm 20 seals lead 28 and high pressure in compartment 23 is maintained by resistors 127 and 126 as fluid flows through capacitor 125. This maintains a charge on the capacitor 125, and holds compartment 23 of element 130 at its high pressure condition sealing outlet 116.

At the leading edge negative transition of waveform 117 then, the diaphragm 20 of flip flop element 116 will switch closing outlet 115, and premitting capacitor 125 to discharge through resistors 126 and 127 thereby keeping vent 119 low until the valve 118 is released at the trailing edge of waveform 117. Thus at lead 115 the waveform 129 will be developed for a time duration longer than that of input waveform 117 because of the discharging of capacitor 125.

During this period element 130 holds lead 116 sealed so that source 132 cannot pass fluid through compartments 24 of elements 116 and 130 to vent at 131, through the opened passageway 28. Thus the output waveform 133 remains high until element 130 is switched at the trailing edge of waveform 129. When the pressure in upper compartment 23 of element 130 falls sufficiently through discharge of capacitor 125, then the diaphragm 20 will open vent 131 and terminate the stretched output waveform 133 by making a negative dynamic swing in compartment 24 of flip flop element 116 which causes the diaphragm 20 to close line 28 and again charge capacitor 125 from source 132 through compartment 23 and resistor 127. Then a repeat cycle can occur at any time after the capacitor is charged.

If negative transitions are used as signal waveforms then that of output waveform 133 is at a later time than that of input waveform 117 thereby providing a time delay function. If the waveform shape is used, then the output waveform 133 extends beyond the input waveform 117 and thus a waveform stretching or integration operation is provided.

Figure 15:
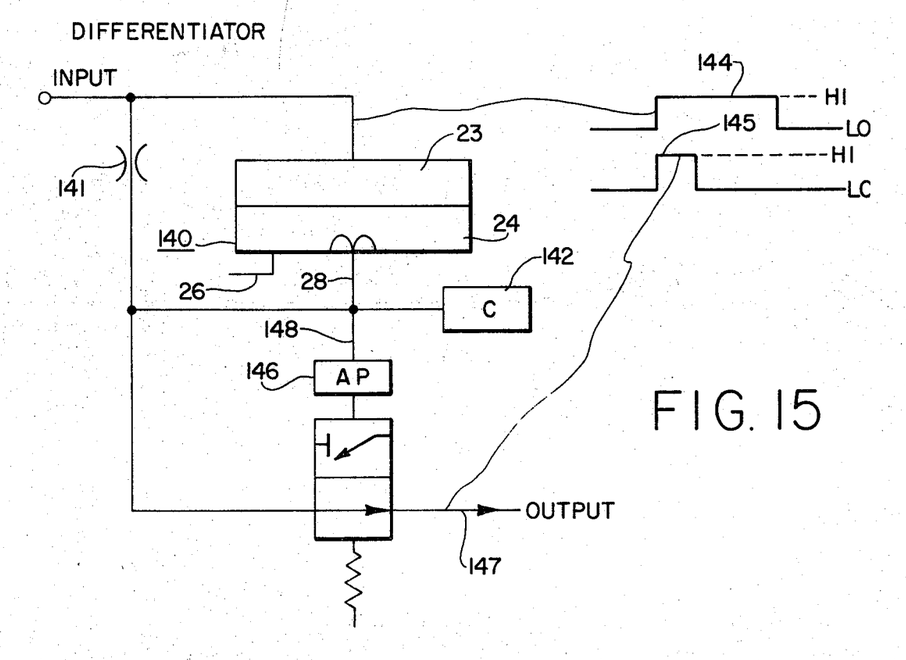
FIGS. 15 and 16 are schematic diagrams of differentiator circuit embodiments for decreasing the duration of an input signal waveform.

Particularly where manual input pulses may be of uncontrolled length and logic systems may be operable on pulses of predetermined shorter duration, it may also be desirable to shorten or differentiate a waveform. One circuit configuration for doing this is set forth in FIG. 15 using logic amplifier device 140 and the R-C time constant circuit 141, 142. Thus input waveform 144 will cause signal passageway 28 to be sealed closing vent 26, and will put a charge on capacitor 142 through resistor 141. By means of the logic circuit shown as air pilot 146, the input wave is conveyed to the output lead 147 until the charge on capacitor 142 reaches a threshold value at lead 148 which operates the device 146 to block the output line 147 at the trailing edge of output waveform 145. When the input waveform 144 expires at its trailing edge, the vent 26 will be opened to discharge the capacitor 142 returning air pilot 146 to the shown static condition and preparing the circuit for another cycle responsive to a further input signal waveform 144.

Figure 16:
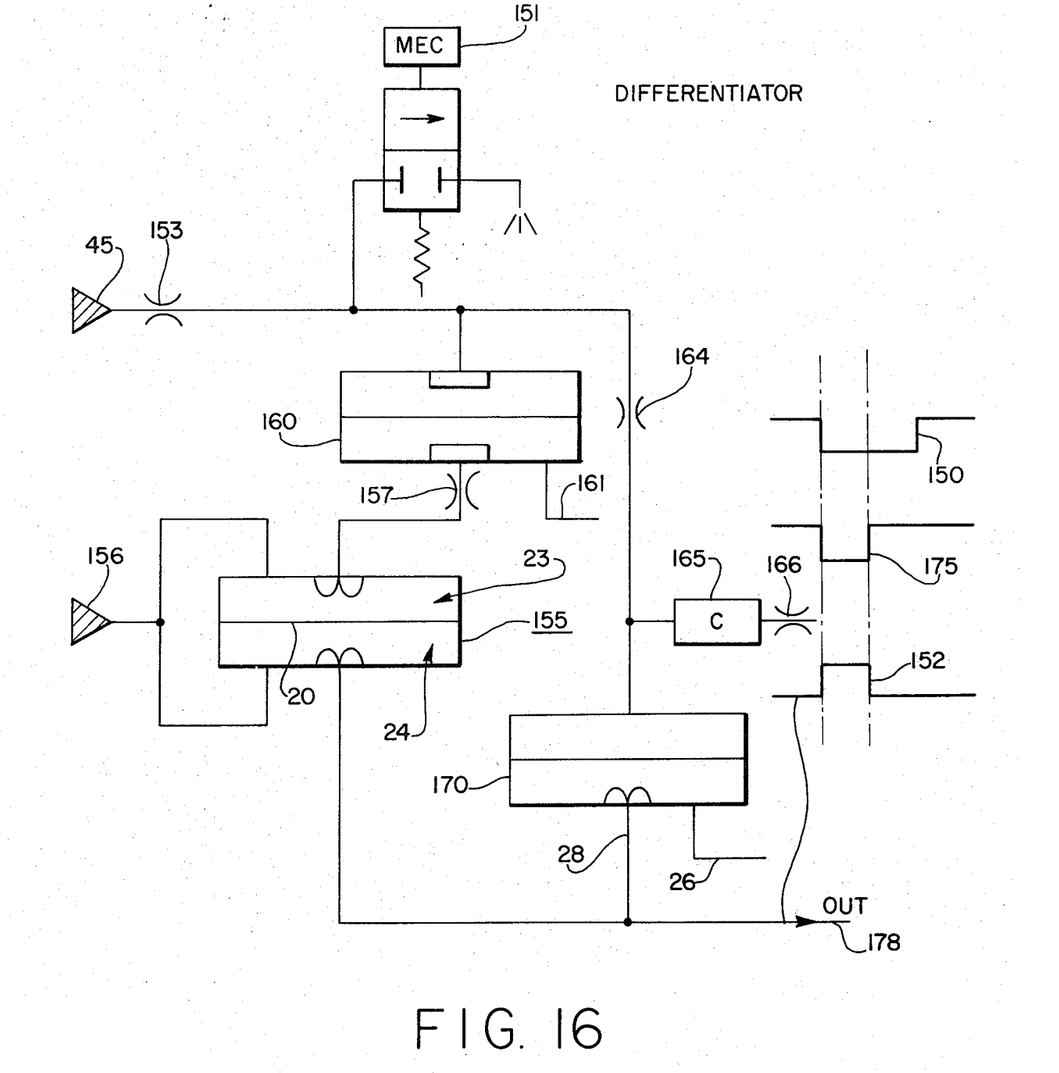

Another differentiator circuit embodiment is shown in FIG. 16, where a longer input waveform 150 derived for example from the manual venting valve 151 through resistor 153 from source 45 is shortened to produce output waveform 152. At the start of the operation flip-flop device 155 will pass fluid from source 156 (which may be the same as 45) through the upper chamber 23 and through resistor 157 to the linear amplifier device 160. However the vent 161 is held closed by fluid from source 45 until the input waveform 150 starts. The negative going transition signal at the leading edge switches element 160 to open vent 161 and thus provides a negative going signal to compartment 23 of flip-flop 155. Thus the flip-flop is switched to open flow through lower compartment 24 and fluid flows from source 156 to form an output waveform 152 leading edge.

In the ready or static condition, capacitor 165 is charged as fluid flows from source 45 by way of resistor 164 and vents out resistor 166. In the presence of the input waveform of lowered pressure, the capacitor 165 will discharge because flow of fluid thereinto is stopped and both ends are vented. Thus amplifier element 170 unseals signal passageway 28 to open vent 26 and form the trailing edge of the output waveform at a time determined by the R-C discharge constant of the capacitor 165. This negative going transition at the lower compartment 24 also results in switching flip-flop 155 to close the path from source 156 to the output lead 178. Then fluid flow through resistor 157 and vent 161 reduces the pressure in the bottom chamber of the logic element 160, so that upon expiration of the vented input pulse 15, pressure source 45 will close vent 161 and reestablish a charge on capacitor 165 for awaiting another operation cycle.

From the foregoing examples of the advances and discoveries afforded by this invention it is shown that a novel operational mode of fluid logic elements is provided by critical novel structural features and that such logic elements can be made thereby not only to perform their usual logic switching decisions but also may simultaneously control the relationship between input and output waveform shapes in a predetermined manner. Accordingly the mode of operation is changed to perform logic functions more simply, more efficiently and more effectively. Because of the nature of the improvements and the scope of applications therefore certain variations will be suggested to those skilled in the art that will not depart from the spirit or scope of the invention, which is set forth with particularity in the appended claims.

What is claimed is:

1. A logic fluid element for processing on-off type digital fluid signal waveforms to produce a change of signal waveform shape comprising in combination, an impervious thin flexible taut diaphragm clamped at its outer periphery between two members and movable into a flexed position in response to the differential pressure of fluid signals on opposite sides thereof, first and second chambers for confining respective fluid flow signals to contact at least a portion of said diaphragm on respective ones of said opposite sides and for receiving the diaphragm in said flexed position in response to differential fluid pressures in the two chambers, and a signal flow passageway with an outlet extending into the first one of said chambers and having diaphragm engaging structure positioned thereabout to intercept said flexed diaphragm with a contact surface structure shaped to modify the flexed curvature surface attained by said diaphragm in responsee to the differential pressure in said two chambers, to thereby control by said modified curvature surface the flow of fluid through said signal passageway wherein said diaphragm engaging structure comprises a leaky diaphragm engaging structure having serrated fluid conveying passages therein to prevent the diaphragm from conforming thereinto to stop flow of fluid therethrough by fluid on the opposite side of the diaphragm until a predetermined pressure is reached sufficient to deform the diaphragm into closing contact in said first chamber outside said fluid conveying passages, thereby constituting a switching device operable to close and open said passageway substantially at the same predetermined pressure magnitude.

2. A combination as defined in claim 1 operably connected in a system providing a maximum fluid pressure limit to flex said diaphragm wherein the passages are so proportioned with the diaphragm flexibility and surface tension that said predetermined pressure is substantially equal to said predetermined pressure magnitude.

3. A combination as defined in claim 1 wherein said diaphragm engaging structure comprises a substantially conical shaped indentation having said serrated fluid conveying passages thereabout.

4. A combination as defined in claim 1 wherein said diaphragm engaging structure comprises a pedestal about said passageway with said serrated passages disposed on said pedestal about said passageway.

5. A combination as defined in claim 4 wherein said signal passageway includes a channel of such proportions to carry fluid into said first chamber terminating in a seating area on said pedestal of expanded dimensions for said diaphragm positioned to intercept said diaphragm over a contact area larger than that of said channel and chamber structure outside said pedestal area to contact said diaphragm for sealing off the flow of fluid in said signal passageway when said differential fluid pressure is of a predetermined magnitude great enough to force the diaphragm into sealing engagement outside said pedestal.

6. A logic fluid element for processing on-off type digital waveforms to produce a change of signal waveform shape comprising in combination, an impervious thin flexible taut diaphragm clamped at its outer periphery between two members and movable into a flexed position in response to the differential pressure of fluid signals on opposite sides thereof, at least one chamber on one side of said diaphragm for confining fluid, means in said chamber defining a fluid flow path therethrough between an inlet and outlet port, diaphragm engaging structure comprising a smooth rounded protruding lip structure positioned concentrically about only one of said ports to extend inwardly from the chamber surface to engage the midregion of said diaphragm when flexed so that the diaphragm surface is indented by the lip structure on both sides of the lip to wrap about the smooth rounded lip surface, means closing the flow of fluid through said path by instituting a fluid control pressure of predetermined magnitude on the opposite side of said diaphragm to wrap said diaphragm about said lip structure with a central portion indented into said port, means establishing fluid under pressure in said flow path at a magnitude in the order of said fluid control pressure, and means for opening the passageway including a signal comprising a fractional reduction of said magnitude of said fluid control pressure and said fluid under pressure thereby opening the path between the inlet and outlet ports with a lower pressure magnitude thereby to operate said element as an amplifying gate.

* * * * *